Patented May 2, 1950

2,506,019

UNITED STATES PATENT OFFICE 2,506,019

CARBOXYPHENYLAMINO-AMINO-DIPHENYL SULFIDE AND PREPARATION THEREOF

Alan August Goldberg, Somerset, and Harold Silas Turner, Manchester, England, assignors to Ward, Blenkinsop & Company Limited, London, England, a British company No Drawing. Application October 24, 1947, Serial No. 782,014. In Great Britain August 23, 1946

3 Claims. (Cl. 260—516)

This invention relates to diphenylamine 2-carboxylic acids carrying as a substituent in the para position in the benzene nucleus which does not carry the carboxyl group a phenyl sulphide, phenyl sulphoxide, phenyl sulphone or phenyl disulphide substituent and to a method for the production thereof. These compounds have the general formula

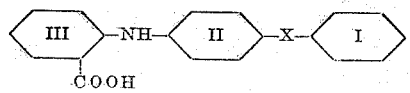

in which the group X represents one of the groupings —S—, —SO—, —SO₂— or —S—S— and the phenyl nucleus II is free from additional substituents.

According to the present invention there are provided substituted diphenylamine 2-carboxylic acids having the general formula

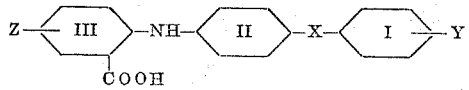

in which X is a sulphur-containing group directly linked to a nuclear carbon atom of each of the phenyl residues I and II and is selected from mono-sulphide, disulphide, sulphoxide and sulphone, the phenyl residue II containing no additional substituents, Y is selected from hydrogen, amino, acylamino, nitro and halogen, and Z is selected from hydrogen and halogen.

Also according to the present invention the process for the production of a compound of the said general formula comprises reacting an o-halogenobenzoic acid with a compound containing only one free amino group and having the general formula

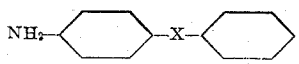

in which X is as above defined and the phenyl nucleus containing the free amino group is free from additional substituents.

The o-halogenobenzoic acid employed may or may not carry one or more additional substituents in the benzene ring. Thus there may be present an additional halogen atom. Examples of such acids are 2.3-dichlorobenzoic acid, 2.4-dichlorobenzoic acid, 2.5-dichlorobenzoic acid, 2.6-dichlorobenzoic acid and 2-chloro-6-methoxy-benzoic acid. The halogen atom in the ortho position to the carboxyl group is more reactive than a halogen substituent in any other position in the benzoic acid nucleus since when an orthohalogenobenzoic acid containing additional halogen substituents in other positions is employed reaction nevertheless occurs at the ortho position.

The compound having the general formula

may also carry one or more additional substituents in the nucleus which does not carry the free amino group. Such additional substituents may, for example, be a protected amino group, such as an acylamino, nitro or halogen.

The reaction is preferably carried out in a suitable solvent in the presence of an acid acceptor and a catalyst. Preferred acid acceptors are the alkali metal carbonates such as potassium carbonate used in excess of that required for salt formation and a preferred catalyst is copper powder. Other sources of copper such as copper salts may also be used. A suitable solvent is one which dissolves or partially dissolves one or both of the reactants such as butyl or amyl alcohols.

In carrying out the process of the invention a convenient procedure is to heat the reactants, the catalyst, the acid acceptor and the solvent together, to remove the solvent in any convenient manner such as by steam distillation and to acidify the resulting aqueous solution in order to precipitate the free carboxylic acid. It is advantageous to stir the reaction mixture and to operate at the boiling point of the solvent employed in order to obtain efficient mixing. In certain cases for example, when X is a sulphide or disulphide group, it is desirable to carry out the reaction in the presence of an inert atmosphere, such as an atmosphere of nitrogen in order to avoid oxidation by atmospheric oxygen.

Those products which contain in the phenyl nucleus (I) a group such as an acylamino group or other group which may be readily converted to an amino group in the presence of the Group X may, in accordance with a feature of the invention, be converted into such compound containing a free amino group. Thus 4-(2''-carboxylphenylamino) - 4' - acetamidodiphenyl sulphide may be deacylated on treatment with dilute alkali or acid to give 4-(2''-carboxylphenylamino)-4'-aminodiphenyl sulphide or the 4'-nitro compound may be reduced to the corresponding 4'-amino compound. The resulting amino compounds may then be further reacted, in accordance with the process of the invention, with an o-halogenbenzoic acid which may be the same as or different from that employed in the previous condensation.

The products obtained in accordance with the invention are of considerable pharmaceutical interest. Those which are diphenyl sulphones carrying an ortho-carboxylphenylamino substituent in the para-position with respect to the sulphone group have valuable antibacterial properties of the kind encountered with the corresponding sulphones carrying a free amino group but they are more soluble and of lower toxicity. The products have been found to possess high antitubercle activity. This activity is also shown by those compounds containing additional substituents, such as halogen atoms, in the phenyl nucleus carrying the carboxyl group.

The following example illustrates the manner in which the invention may be carried into effect:

*Example*

38.7 gms. of 4-amino-4'-acetylaminodiphenyl sulphide, 23.4 gms. of o-chlorobenzoic acid, 22.7 gms. of anhydrous potassium carbonate and 0.5 gm. of copper powder are refluxed together with 250 ccs. of amyl alcohol in an atmosphere of nitrogen for 2 hours. The solvent is removed in a current of steam, the solution filtered and acidified at the boiling point; on heating on the water bath the initially liquid precipitate solidifies. This is collected and redissolved in 1.5 litres of water and 10 gms. of potassium carbonate, the solution filtered with charcoal and again precipitated and the yellow solid filtered off. Yield 22 g. M. Pt. 195–200° C. Recrystallisation from alcohol and then from ethyl acetate gives 4-(o-carboxyphenylamino)-4'-acetamido diphenyl sulphide in the form of cream needles M. Pt. 210–211° C. (Found: M. 389, $C_{21}H_{18}O_3N_2S$ requires 378). This may be deacylated by treatment with dilute alkali or acid to give 4-(o-carboxyphenylamino)-4'-amino diphenyl sulphide.

We claim:

1. As a new product 4-(ortho-carboxyphenylamino)-4'-amino diphenyl sulphide.

2. The process of preparing 4-(ortho-carboxyphenylamino)-4'-amino diphenyl sulphide which comprises reacting an orthohalogenobenzoic acid with a 4-amino - 4'-carboxyacylamidodiphenyl sulphide in the presence of an acid acceptor and metallic copper, separating the resulting 4-(orthocarboxyphenylamino)-4' - carboxy - acylamidophenylsulphide and hydrolysing the carboxyacylamido group.

3. The process of preparing 4-(ortho-carboxyphenylamino)-4'-amino diphenyl sulphide which comprises heating together an alkali metal salt of an orthohalogenobenzoic acid and a 4-amino-4'-carboxyacylamidodiphenyl sulphide in the presence of an alkali metal carbonate and metallic copper, separating the resulting 4-(ortho-carboxyphenylamino) - 4' - carboxyacylamidodiphenyl sulphide and hydrolysing the carboxyacylamido group with a mineral acid.

ALAN AUGUST GOLDBERG.
HAROLD SILAS TURNER.

REFERENCES CITED

The following references are of record in the file of this patent:

UNITED STATES PATENTS

| Number | Name | Date |
|---|---|---|
| 2,003,842 | Spiegler | June 4, 1935 |
| 2,151,543 | Zerweck et al. | Mar. 21, 1936 |

OTHER REFERENCES

Chemical Abstracts, vol. 26 (1932), page 2184 (Abstract of Sergeev, "J. Gen. Chem.," U. S. S. R., vol. 1 (1931), pp. 229–288).